United States Patent
Spanke et al.

(10) Patent No.: US 8,938,741 B2
(45) Date of Patent: Jan. 20, 2015

(54) ELECTRONIC DEVICE AND METHOD FOR PERFORMING MULTIPLE PROCESSES WITH THE ELECTRONIC DEVICE

(75) Inventors: Dietmar Spanke, Steinen (DE); Stefan Maier, Rheinfelden (DE); Martin Link, Merdingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 1892 days.

(21) Appl. No.: 11/632,729

(22) PCT Filed: Jul. 5, 2005

(86) PCT No.: PCT/EP2005/053198
§ 371 (c)(1),
(2), (4) Date: Dec. 17, 2007

(87) PCT Pub. No.: WO2006/008237
PCT Pub. Date: Jan. 26, 2006

(65) Prior Publication Data
US 2008/0141269 A1    Jun. 12, 2008

(30) Foreign Application Priority Data

Jul. 20, 2004    (DE) .................. 10 2004 035 097

(51) Int. Cl.
G06F 9/46      (2006.01)
G01F 23/00     (2006.01)
G01F 23/284    (2006.01)

(52) U.S. Cl.
CPC .......... *G01F 23/0069* (2013.01); *G01F 23/284* (2013.01)

USPC .......................................... 718/107; 718/100

(58) Field of Classification Search
USPC ................... 718/100, 107; 700/281
See application file for complete search history.

(56) References Cited

U.S. PATENT DOCUMENTS

| | | | | |
|---|---|---|---|---|
| 5,646,845 A | * | 7/1997 | Gudat et al. | 701/41 |
| 5,754,452 A | | 5/1998 | Pupalaikis | |
| 6,006,324 A | * | 12/1999 | Tran et al. | 712/204 |
| 6,014,651 A | * | 1/2000 | Crawford | 705/400 |
| 6,232,974 B1 | * | 5/2001 | Horvitz et al. | 345/419 |
| 6,411,943 B1 | * | 6/2002 | Crawford | 705/400 |

(Continued)

FOREIGN PATENT DOCUMENTS

| | | |
|---|---|---|
| DE | 197 50 026 A1 | 6/1999 |
| DE | 101 62 853 C1 | 6/2003 |

(Continued)

*Primary Examiner* — Charles Kasenge
(74) *Attorney, Agent, or Firm* — Bacon & Thomas, PLLC

(57) ABSTRACT

An electronic device, and a method for executing a plurality of processes with the electronic device, wherein, in a resource-conserving manner, rapid response times are achievable, in that the electronic device, during operation, executes first and second processes (P1, P2), of which the first processes (P1) are executable as approximate solutions (P1-A) and as detailed calculations (P1-C). The electronic device includes a processor for executing processes (P1, P2) and an electronic unit or a multitasking-capable operating system. The electronic unit includes a component, which recognizes whether the processor is active, and serves, while the processor is active and a simultaneous execution of at least two processes is required, for executing the first processes (P1), in that it, itself, determines the approximate solution (P1-A) and sets such in the place of a detailed calculation (P1-C) determined with the processor.

9 Claims, 3 Drawing Sheets

(56) References Cited

U.S. PATENT DOCUMENTS

| | | | |
|---|---|---|---|
| 6,580,969 B1 * | 6/2003 | Ishida et al. | 700/245 |
| 6,832,132 B2 * | 12/2004 | Ishida et al. | 700/245 |
| 7,454,754 B2 * | 11/2008 | Tajima | 718/104 |
| 2002/0123979 A1 * | 9/2002 | Chaudhuri et al. | 707/1 |
| 2002/0124001 A1 * | 9/2002 | Chaudhuri et al. | 707/100 |
| 2003/0229419 A1 * | 12/2003 | Ishida et al. | 700/245 |
| 2004/0210901 A1 * | 10/2004 | Jones et al. | 718/102 |
| 2004/0210904 A1 * | 10/2004 | Jones et al. | 718/107 |
| 2004/0216121 A1 * | 10/2004 | Jones et al. | 718/107 |
| 2004/0236735 A1 * | 11/2004 | Chaudhuri et al. | 707/3 |
| 2005/0005273 A1 * | 1/2005 | Jones et al. | 718/108 |
| 2005/0050041 A1 * | 3/2005 | Galindo-Legaria et al. | 707/4 |
| 2005/0228772 A1 * | 10/2005 | Faunce et al. | 707/2 |
| 2007/0220520 A1 * | 9/2007 | Tajima | 718/104 |

FOREIGN PATENT DOCUMENTS

| | | |
|---|---|---|
| DE | 697 16 922 T2 | 8/2003 |
| DE | 102 60 660 B3 | 9/2004 |
| EP | 1 015 043 A1 | 7/2000 |
| EP | 1 152 219 A1 | 11/2001 |
| WO | WO 99/12584 | 3/1999 |
| WO | WO 2004/059400 A1 | 7/2004 |

* cited by examiner

ELECTRONIC DEVICE AND METHOD FOR PERFORMING MULTIPLE PROCESSES WITH THE ELECTRONIC DEVICE

FIELD OF THE INVENTION

The invention relates to an electronic device and a method for performing multiple processes in the electronic device.

BACKGROUND OF THE INVENTION

Electronic devices are used today in almost all areas of life, especially in industry, in the field of measurement and control technology, in measuring devices, sensors, transmitters, etc.

Electronic devices incorporate electronic components, e.g. microcontrollers, microprocessors or digital signal processors, which serve for performing processes in the devices. Processes include e.g. calculations, comparisons, adjustments, calibrations or compensations.

Electronic devices encompass, for example, measuring devices, which register a physical variable, e.g. a pressure, signal travel time, signal amplitude or a capacitance. The physical variable is converted by means of a transducer unit into an electrical variable, which is then conditioned and evaluated. In such case, as a rule, a multiplicity of different processes occur, which are performed in the electronic device.

There are e.g. fill level measuring devices on the market, which emit a transmission signal, e.g. an ultrasonic signal or a microwave signal, in the direction of a fill substance located in a container, then register its echo signal, and, on the basis of the received echo signal, calculate a current fill level. The calculation requires execution of a multiplicity of different processes, including e.g. temperature compensation of the echo signal, derivation of an echo function presenting amplitude of the echo signal as a function of travel time, identification of a wanted echo attributable to a reflection on a surface of the fill substance, derivation of a travel time of the wanted echo, and determination of the current fill level on the basis of such travel time.

For the individual processes, there are, as a rule, predetermined algorithms available, which are worked through sequentially.

Additionally, further complex calculations can be required, such as e.g. calculation of flow through a ditch, or trough, as a function of measured fill level.

In measurement and control technology, it is, in such case, of special importance to be able to obtain a desired result as rapidly and resource-conservingly as possible. Electronic devices are frequently integrated into large plants and form a part of a large control and regulation system. In such case, as a rule, many different electric devices are distributed over the plant and e.g. connected via a bus connection, such as e.g. Fieldbus, Profibus, or the like, to a superordinated unit, e.g. a process control system or a programmable logic controller. In such case, it is important that each component exhibits short response times, in order that the entire system can react sufficiently rapidly. This is, for example, especially important in industrial manufacturing and/or processing operations. In the case of bus connections, the data transmission satisfies rigidly predetermined standards. In these standards, as a rule, a so-called response time is prescribed. This is the time, which is available to the electronic device following a query. Within this time, the relevant response must be placed on the bus. Typical queries concern, for example, measured values, which are updated in regular intervals. If the response can not be calculated sufficiently rapidly, or be made available, as the case may be, then complicated buffer remedies must be provided. Only in this way is it possible to assure that the device can maintain short response times even during the calculating of the updated measured values. In such case, as a rule, the last-calculated measured value is stored in a memory. Upon queries which enter during the calculating of the new, measured value, the previous measured value stored in the buffer is issued as response. Such buffer solutions are, however, expensive.

In electronic devices, only limited resources are available. As a rule, the available computing power and the available energy are strongly limited.

In order, in spite of this, to achieve short response times in the case of electronic devices, a method is described in DE 697 16 922 T2 for performing a calculation of a function F(X). Thus, in a detailed calculation, the function F(X) is determined, and, following thereon, also its derivative F'(X). In order to assure short response times, the two calculations are regularly interrupted, in order to determine an approximate solution for the calculation, which is then available on very short notice.

The detailed calculation is repeatedly interrupted, in order to calculate an estimate of the result. The estimate is rapidly available, however has a correspondingly lesser accuracy. The time required for the detailed calculation gets longer by the amount of time needed for calculating the approximate solutions.

SUMMARY OF THE INVENTION

It is an object of the invention to provide an electronic device, and a method for performing multiple processes in the electronic device, in the case of which rapid response times are achievable in resource-conserving manner.

To this end, the invention resides in an electronic device,
which, during operation, executes first and second processes,
of which the first processes are executable in the form of an approximate solution and in the form of a detailed calculation,
having a processor for executing processes, and
having an electronic unit
which includes a component, which recognizes whether the processor is active, and
which serves for performing first processes while the processor is active, by determining relevant approximate solutions and providing such in place of detailed calculations determined with the processor.

In an embodiment, the processor comprises a digital signal processor.

In a further embodiment, the electronic unit comprises a microcontroller.

In a further development, the component includes a communication line, via which the processor is connected with the electronic unit.

Additionally, the invention resides in a method for performing in an electronic device first processes executable in the form of an approximate solution and in the form of a detailed calculation and second processes executable in the form of a detailed calculation, wherein the electronic device includes
a processor for executing processes, and
an electronic unit,
which has a component which recognizes whether the processor is active,
wherein the processor, when it is free, executes, sequentially, processes awaiting execution, and wherein, when the processor is active, first processes are executed in parallel by the electronic unit, by itself determining relevant approximate solutions and setting them in place of detailed calculations determined with the processor.

Further, the invention resides in an electronic device, which, during operation, executes first and second processes,
of which the first processes are executable in the form of an approximate solution and in the form of a detailed calculation,
having a multitasking-capable operating system for execution of the processes,
which serves, during the simultaneous running of at least two processes, for performing first processes, by determining relevant approximate solutions and setting them in the place of detailed calculations.

Additionally, the invention resides in a method for performing, in an electronic device, first processes executable in the form of an approximate solution and in the form of a detailed calculation and second processes executable in the form of a detailed calculation, wherein the electronic device includes
a multitasking operating system for executing the processes,
which, to the extent that only one process awaits execution, executes its detailed calculation, and
which, to the extent that at least two processes await execution, executes first processes by determining relevant approximate solutions and setting them in place of detailed calculations.

In a further development of the method, in the case of the processes executed by an approximate solution, additionally an estimate of an accuracy of the approximate solution is executed.

DESCRIPTION OF THE PREFERRED EMBODIMENTS

Figure 1:
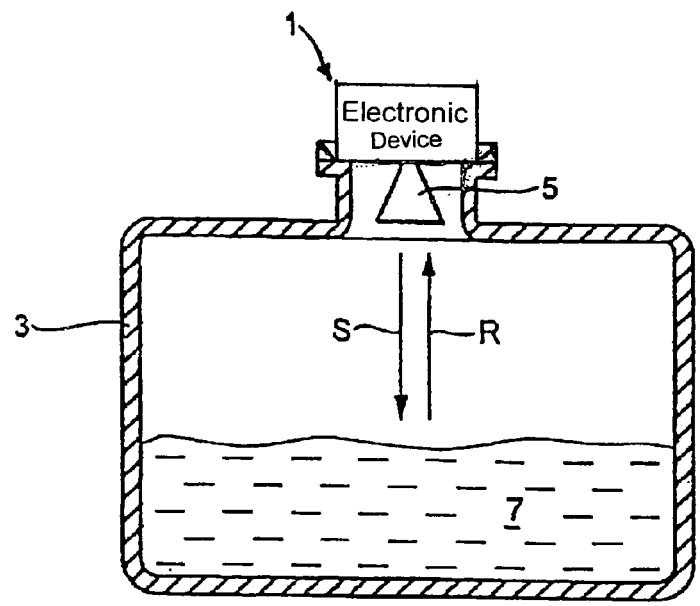
FIG. 1 shows a fill-level measuring device mounted on a container.

FIG. 1 displays an electronic device 1 that, during operation, executes processes. The illustrated example of an embodiment involves a fill-level measuring device working according to the travel-time principle. It is mounted on a nozzle of a container 3 and emits, by means of an antenna 5, transmission signals S, e.g. microwaves, toward a fill substance 7 in the container 3. In turn, the device receives via antenna 5 an echo signal R of the transmission signal S and determines on the basis of the echo signal R a fill level L of the fill substance 7 in the container 3. To this end, e.g. an echo function is derived, which represents amplitude of the echo signal R as a function of travel-time. The echo function is stored in digital form, where it is available for subsequent processing and evaluation. For this, a multiplicity of different processes are used, which must be executed.

Thus, for instance, a wanted echo of the echo signal R must be identified. The wanted echo is that which arises from a reflection on the surface of the fill substance. On the basis of its travel-time, the current fill level is determined. For ascertaining the wanted echo, many different, known methods can be used. As examples, mentioned here will be only methods for removing disturbance echoes and methods for detecting multiple echoes.

Additionally, processes which build on previous results can be performed. For instance, if fill level measuring devices are used for fill level measurement of an open ditch, or trough, then a build-on process can be, for example, a calculating of the flow through the ditch, or trough, based on fill level.

Additionally, a multiplicity of further processes can be activated, such as e.g. compensation, and/or calibration, procedures, conversions of measurement results into different units, etc.

For every individual process to be executed, there is an algorithm available in the electronic device, and there is a way of accessing data and measurement results, e.g. initialization data, container characteristics, or the echo function, required for execution of the algorithm.

According to the invention, the individual processes to be performed are subdivided into first processes P1 and second processed P2.

The first processes can be executed in the form of an approximate solution P1-A and in the form of a detailed calculation P1-C. To this end, there is present in the electronic device, for each of these processes P1, an algorithm for determining the approximate solution P1-A and an algorithm for performing the detailed calculation P1-C. The second processes P2 are not executable in the form of an approximate solution.

Approximate solutions can be obtained, for example, by way of Taylor series or by estimates. An approximate solution is set up for each process. The approximate solution is, in comparison to the detailed calculation, a very simple determination and exhibits a lesser accuracy. The accuracy of the approximate solution can be estimated. In the case of converging Taylor series e.g. the first member of the series not contained in the approximate solution is a measure for the accuracy.

It depends on the application, respectively on the electronic device, whether it is acceptable to use an approximate solution instead of the detailed calculation. If the advantages of a faster, approximate solution outweigh the disadvantages of the greater inaccuracy connected therewith, then the relevant process is categorized as a first process P1, which is executable both in the form of the approximate solution P1-A and also in the form of the detailed calculation P1-C.

Figure 2:
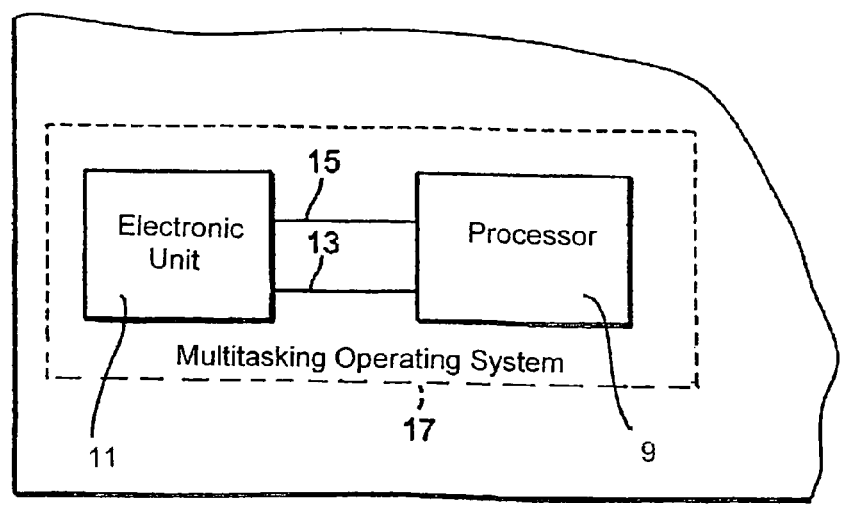
FIG. 2 is a section of a block diagram of an electronic device.

FIG. 2 shows an invention-relevant section of a block diagram of an electronic device 1. Basic components of the section are: A processor 9 for executing processes P1, P2; and an electronic unit 11. Preferably, processor 9 is a digital signal processor and electronic unit 11 is a microcontroller.

Today, in a multitude of electronic devices, an electronic unit and a processor are standard items. While the electronic device is in operation, the electronic unit 11 assumes control of some, or all, processes running in the device, and the processor 9 executes the processes fed to it.

Preferably, the processes to be executed are fed to the processor 9 exclusively through the electronic unit 11. To this end, a connection 13 is provided between the electronic unit 11 and the processor 9. Via this connection 13, the electronic unit 11 sends work-orders to the processor 9 for the processes to be executed.

The electronic unit 11 includes a component, which recognizes whether processor 9 is active.

This component can comprise, for example, an additional communication line 15, via which the electronic unit 11 can direct a corresponding query to the processor 9 and receive its report back. Just as well, this component can, however, also use the connection 13. Thus, the electronic unit 11 can, for example, send a work-order to the processor 9. If processor 9 does not react to the incoming work-order, e.g. by issuing a confirmation of receipt, then this is the same as saying that the processor 9 is active.

If the electronic unit 11 detects that processor 9 is active, then it executes the waiting, first processes P1, while the processor 9 is active. For this purpose, it itself executes, in each case, the approximate solutions P1-A of the first processes P1 and sets these in place of detailed calculations P1-C determined with the processor 9.

According to the invention, the procedure, in such case, is to have processor 9, to the extent that it is free, execute sequentially the first and second processes P1, P2 waiting to be executed. If processor 9 is free, then no approximate solutions are used.

If the component determines, however, that processor 9 is active, then, during the time that the processor 9 is active, first processes P1 are executed in parallel by the electronic unit 11, by itself determining the relevant approximate solutions P1-A and setting such in the place of detailed calculations P1-C determined with the processor 9.

Preferably, the electronic unit 11 performs, in addition to each executed approximate solution P1-A, an estimate of an accuracy of the approximate solution P1-A and makes this available to the electronic device and/or its operator.

Figure 3:
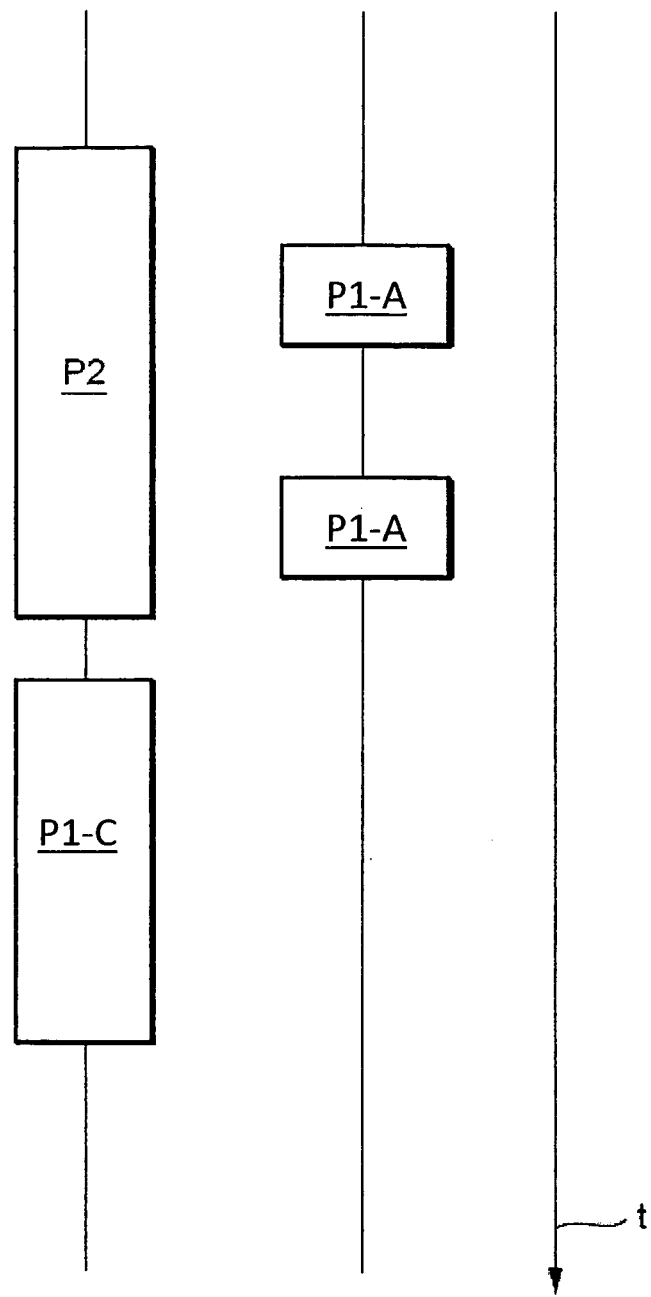
FIG. 3 is an example of a method flow diagram.

FIG. 3 shows an example of a typical method flow. In such case, the left column shows the processes executed by the processor 9, and the right column the processes executed by the electronic unit 11. The time axis t extends downwards.

At the beginning, processor 9 is free. The method plans execution of a second process P2. Thereafter follow three first processes P1 to be executed. Appropriately, processor 9 begins with execution of the second process P2. The electronic unit 11 then recognizes that processor 9 is active and reviews whether first processes P1 are to be executed. This is, for the illustrated method flow, the case. Accordingly, the electronic unit 11 determines the approximate solution P1-A for the first queued, first process.

Then, the second first process P1 is to be executed. The electronic unit 11 determines that processor 9 is still active and so next figures-out the approximate solution P1-A for the second queued, first process P1.

Thereafter, the third queued, first process P1 is to be executed. The electronic unit ascertains that processor 9 is now free. As a result, processor 9 is assigned the task of determining the detailed calculation P1-C.

This method effects a marked savings of time. While processor 9 is executing a first or a second process P1, P2, all subsequent first processes P1 can be executed in parallel by the electronic unit 11.

As a rule, an electronic unit 11 is present anyway in electronic devices 1 and is used e.g. for process flow control. The electronic unit 11 is mostly just a simple, inexpensive component, which would not be capable of executing detailed calculations. It is, however, as a rule, capable of executing simple determinations, such as are required for determining approximate solutions. If such is the case, there are no additional costs associated with the electronic unit 11.

Alternatively, the invention is also usable in the case of electronic devices having a multitasking-capable operating system 17, which executes instructions on a processor 17. This is illustrated in FIG. 2. In this case, the processor-equipped, multitasking-capable operating system 17 represented by the dashed lines stands in place of the components 9, 11, 13 and 15.

While, in the case of the previous example of an embodiment, execution of the queued first and second processes is handled by processor 9 and the electronic unit 11, here, all processes are performed by the multitasking-capable operating system 17. Multitasking-capable operating system can process a plurality of processes quasi at the same time. In such case, the available computing power is divided among the individual processes. If two or more processes are executed at the same time, then the time needed for executing the individual processes is lengthened thereby.

According to the invention, the processes are, therefore, also here, subdivided into first and second processes P1, P2, with the first processes being executable in the form of an approximate solution and in the form of a detailed calculation.

During the same-time execution of at least two processes, the operating system 17 executes the first processes P1 by determining the relevant approximate solutions P1-A and sets such in the place of detailed calculations P1-C.

Preferably, in such case, a procedure is followed, in which the multitasking-capable operating system 17, to the extent that only one process P1 or P2 is queued for execution, conducts its detailed calculation. If, however, two or more processes are awaiting execution, then the first processes P1 are worked-through by the operating system 17, in that the relevant approximate solutions determined and set in place of detailed calculations.

This offers the advantage that, usually, an exact calculation is done. Only when the operating system 17 actually is executing two or more processes at the same time are the approximate solutions determined for the first process P1.

Figure 4:
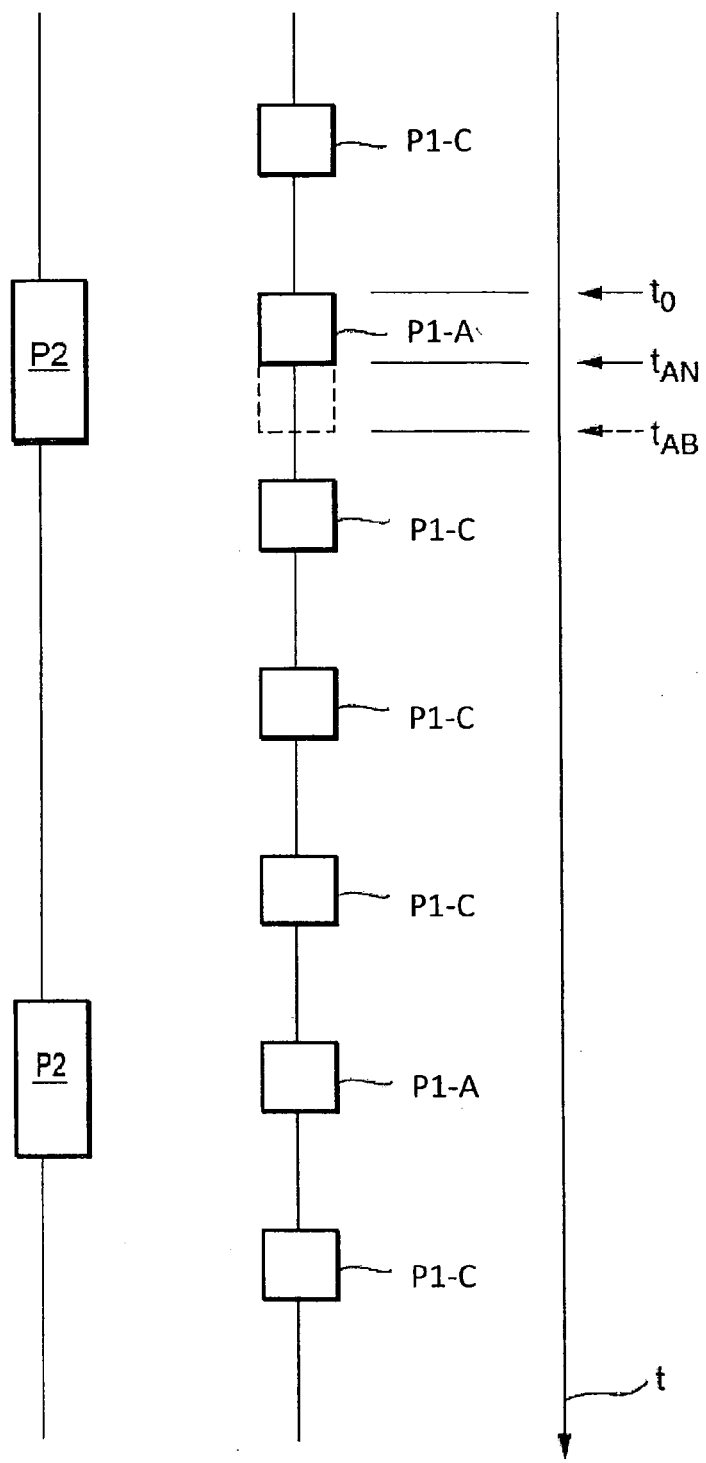
FIG. 4 is an example of a method flow diagram.

FIG. 4 shows an example of such a process flow. In the case of the illustrated example of an embodiment, first processes P1 are to be executed at regular intervals. At the beginning, only one first process P1 awaits execution. It is executed in the form of a detailed calculation P1-C. Then, a second process P2 and a first process P1 are executed. Since the processor the operating system 17 is executing two processes P1 and P2 at the same time, the first process P1 is executed in the form of the approximate solution P1-A. Following this, three first processes P1 are sequentially executed. Since, in such case, in each instance, only one processes is being executed, it follows that, in each case, the detailed calculation P1-C is performed. Thereupon follows, anew, a simultaneous executing of a first process P1 and a second process P2. Here, again, the approximate solution P1-A is carried out. Finally, one first process P1 follows, for which, in such case, the detailed calculation P1-C is performed.

This offers the advantage, that, of the seven first processes P1, five are executed in the form of detailed calculations. Correspondingly, in such cases, an exact result is available. Only when, in actuality, two processes are being executed at the same time, then greater accuracy yields in favor of a shorter response time. The calculation of the first approximate solution P1-A begins at the point in time t0 and ends at the point in time tAA. If, instead of the approximate solution P1-A, a detailed calculation P1-C would be executed here simultaneously with the second process P2 to be executed, then the calculation would first be completed only at the point in time tAC. If a query comes-in to the electronic device at the point in time t0, then the device of the invention can already, at the point in time tAA, report the approximate solution P1-A e.g. to a bus connection. If, in contrast, the detailed calculation P1-C would have been performed, then the answer would only become available first at the markedly later point in time tAC. The response time is, in the case of the electronic device of the invention, thus, clearly shorter. This offers the advantage that the initially mentioned buffer solutions can be largely dispensed with and always current responses can be issued.

Exactly as in the case of the previous form of embodiment, also, in this case, the approximate solution P1-A can be accompanied additionally by an estimate of the accuracy of the approximate solution P1-A.

LIST OF REFERENCE CHARACTERS 1 electronic device
3 container
5 antenna
7 fill substance
9 processor
11 electronic unit
13 connection
15 communications line
17 multitasking operating system

The invention claimed is:

1. An electronic device, which, during operation, executes first and second processes (P1, P2), of which first processes (P1) are executable in two forms, approximate-solution (P1-A) and detailed calculation (P1-C), comprising:
    a processor for executing processes (P1, P2); and
    an electronic unit, which includes a component, via which the electronic unit can direct a corresponding query to the processor and receive a report from the processor back, to recognize whether said processor is active, and which serves for executing first processes (P1) when said processor is active, in which case said electronic unit determines for a first process awaiting execution a relevant approximate solution (P1-A) and sets such in place of a detailed calculation (P1-C) determined with said processor.

2. The electronic device as claimed in claim 1, wherein: said processor is a digital signal processor.

3. The electronic device as claimed in claim 1, wherein: said electronic unit is a microcontroller.

4. The electronic device as claimed in claim 1, wherein: said component includes a communications line, via which said processor is connected with said electronic unit.

5. A method for performing first processes (P1), each executable in two forms, an approximate solution (P1-A) and a detailed calculation (P1-C), and second processes (P2), each executable only in one form, a detailed calculation, in an electronic device comprising:
    a processor for executing processes (P1, P2); and an electronic unit, which includes a component, via which the electronic unit can direct a corresponding query to the processor and receives a report from the processor back to recognizes whether the processor is active; the method comprising the steps of:
    executing sequentially processes to be executed when the processor is free; and
    executing first process (P1) in parallel by the electronic unit, in that the electronic unit, in such case, determines for a first process awaiting execution a relevant approximate solution (P1-A) and sets such in place of a detailed calculation (P1-C) determined with the processor.

6. The method for performing first and second processes (P1, P2), as claimed in claim 5, wherein, for processes (P1) executed by way of an approximate solution (P1-A), an estimate of an accuracy of the approximate solution (P1-A) is performed.

7. An electronic device, which, during operation, executes first and second processes (P1, P2), of which first processes (P1) are executable in two forms, an approximate solution (P1-A) and a detailed calculation (P1-C), comprising:
    a processor for executing processes (P1, P2);
    an electronic unit, which includes a component, via which the electronic unit can direct a corresponding query to the processor and receive a report from the processor back, to recognize whether said processor is active;
    a multitasking-capable operating system for executing the processes (P1, P2),
    which serves for executing first processes during simultaneous execution of at least two processes, in that, in such case, for a first process, a relevant approximate solution (P1-A) is determined and set in place of a detailed calculation (P1-C).

8. A method for performing first processes (P1), executable in two forms, an approximate solution (P1-A) and a detailed calculation (P1-C), and second processes (P2) executable in only one form, a detailed calculation, in an electronic device comprising:
    a processor for executing processes (P1,P2) ; and an electronic unit, which includes a component, via which the electronic unit can direct a corresponding query to the processor and receive a report from the processor back, to recognize whether said processor is active, the method comprising the steps of:
    providing a multitasking-capable operating system for executing the processes (P1, P2), which, to the extent that only one process of any type is queued for execution, executes its detailed calculation; and to the extent that at least two processes are queued for execution; and
    executing first processes (P1), in that it determines for a first process awaiting execution a relevant approximate solution (P1-A) and sets such in the place of a detailed calculation (P1-C).

9. The method for performing first and second processes (P1, P2), as claimed in claim 8, wherein, for processes (P1) executed by way of an approximate solution (P1-A), an estimate of an accuracy of the approximate solution (P1-A) is performed.

* * * * *